Aug. 6, 1929.　　　L. B. HYDE ET AL　　　1,723,733
ELECTRIC WATER HEATER
Filed March 28, 1928
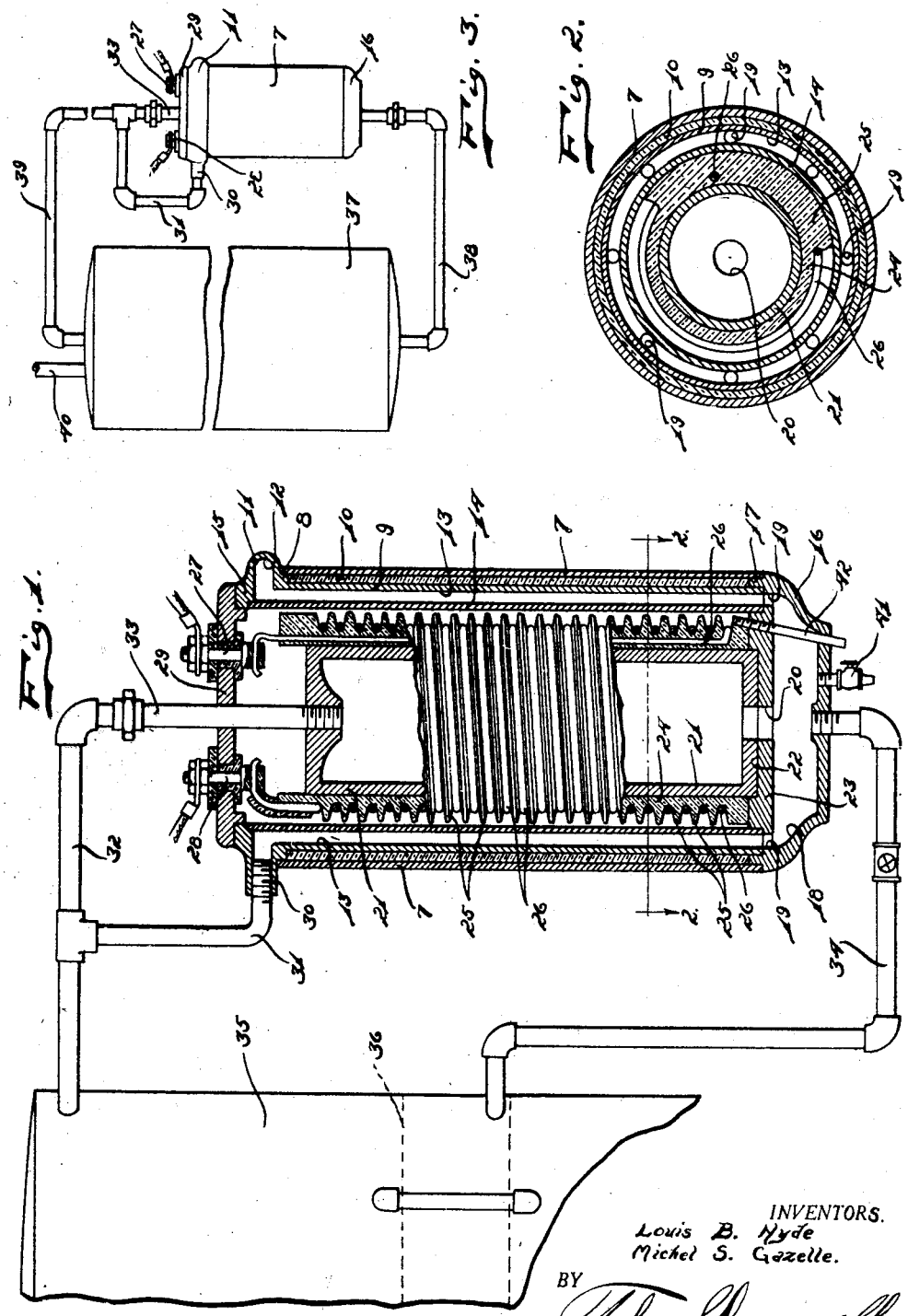
INVENTORS.
Louis B. Hyde
Michel S. Gazelle.
BY Thos. S. Donnelly
ATTORNEY.

Patented Aug. 6, 1929.

1,723,733

UNITED STATES PATENT OFFICE.

LOUIS B. HYDE AND MICHEL S. GAZELLE, OF DETROIT, MICHIGAN.

ELECTRIC WATER HEATER.

Application filed March 28, 1928. Serial No. 265,233.

Our invention relates to a new and useful improvement in an electric water heater adapted for use in heating water for domestic purposes and adapted also for heating water in hot water heating systems and in steam heating systems as well as various other uses which will suggest themselves. It is an object of the present invention to provide an electric heater of this class which will be simple in structure, economical of manufacture and highly efficient in use.

Another object of the invention is the provision of a heater which may be used in conjunction with a heating plant so that a small quantity of water may be heated and quickly converted into steam for deliverance to the heating plant, thence to be distributed to the heating apparatus such as radiators and the like. In a hot water heating system the same effect could be accomplished.

Other objects will appear hereinafter.

The invention consists in the combination and arrangement of parts hereinafter described and claimed.

The invention will be best understood from a reference to the accompanying drawings which form a part of this specification and in which, Fig. 1 is a central longitudinal sectional view of the invention showing it applied to a furnace.

Fig. 2 is a sectional view taken on line 2—2 of Fig. 1.

Fig. 3 is a side elevational view of the invention showing it applied to a hot water tank.

The heater proper comprises a cylindrical outer casing 7 which engages at its upper end a shoulder 8 formed on an inner casing 9 which is spaced by a layer 10 of suitable insulating material, such as asbestos, from the outer casing 7. The casing 9 is provided with a peripheral bead 11 in which is formed a channel 12 communicating with the space 13 lying between the casing 9 and the cylindrical inner casing 14, this inner casing engaging a ring 15 formed on the casing 9. The lower ends of the casings 7 and 9 engage a base 16 on which is formed the flange 17 projecting between the casings 7 and 9 and serving to co-operate with the insulating material 10 for spacing these casings apart. This base 16 is formed hollow to provide a chamber 18 which communicates through openings 19 with the space 13 and which also communicates through the opening 20 with the interior of the drum 21 which sets at one end in a recess 22 formed in the top 23 of the base. Embracing this drum 21 is a core 24 of insulating material and having a plurality of spaced peripheral ribs 25 between which is wound a heating element 26 connected at one end to a terminal 27 and at its opposite end to a terminal 28, these terminals being mounted in and insulated from the top 29, each terminal being suitably connected to a source of electrical energy.

Communicating with the space 13 is a nipple 30 in which is secured an outlet delivery pipe 31 connecting to the pipe 32 which is connected to the pipe 33 communicating through the cover 29 with the interior of the drum 21. In the adaption shown in Fig. 1 an inlet delivery pipe 34 communicates with a boiler 35 below the normal level of the water. The outlet delivery pipe 32 communicates with the boiler 35 above the high water line 36.

A drain pipe 42 communicates the space between the core 21 and the tube 14 with the atmosphere so that accumulation of moisture therein will be prevented. A drain 41 is also mounted in the base 16.

With the device constructed as illustrated and connected as described, there is provided a means exterior of the furnace or boiler for heating small quantities of water in the boiler. As this heating continues and steam is generated in the drum it will pass through the pipes 33 and 32 into the steam dome of the boiler and thence to the radiators. Similarly, steam generated in the space 13 will pass through the pipes 31 and 32 into the boiler. With a connection such as this a small amount of steam may be quickly and economically generated thus affording a means for heating living rooms in an economical manner where only a small amount of heat is desired, as for instance, in the fall and the spring.

If a hot water heating system is used, the same results are obtained as the water would be delivered to the heating element exterior of the boiler or furnace, and in the claims attached hereto the term "furnace" is used to indicate such a structure as has been referred to herein.

In Fig. 3 we have shown the device connected to a hot water tank 37 which is connected by the pipe 38 to the lower end of the electric heater, this heater discharging through the pipe 39 into the tank 37 from which the hot water may be drawn by the delivery pipe 40 thus affording a means for heating the water for domestic purposes when the heating plant of the building is not in operation. Due to the method of heating a small quantity of the water at a time, hot water may be quickly obtained. The device as constructed is one which is compact and durable while at the same time it may be economically manufactured.

While we have illustrated and described the preferred form of our invention, we do not wish to limit ourselves to the precise details of structure shown, but desire to avail ourselves of such variations and modifications as may come within the scope of the appended claims.

Having thus described our invention, what we claim as new and desire to secure by Letters Patent is:

1. A water heater of the class described, comprising: an outer casing; an inner casing; means for insulating said casings from each other; a central casing spaced from said inner casing; a base, said base communicating with the space between said center and said inner casings; a cylindrical heating element positioned within said central casing; a drum positioned within said heating element and in communication with said base; a conduit for delivering liquid to said base; outlet delivery means communicating with said drum; and outlet delivery means communicating with said space adjacent the upper end thereof.

2. A water heater of the class described, comprising: an outer casing; an inner casing; means for insulating said casings from each other; a central casing spaced from said inner casing; a base, said base communicating with the space between said center and said inner casings; a cylindrical heating element positioned within said central casing; a drum positioned within said heating element and in communication with said base; a conduit for delivering liquid to said base; outlet delivery means communicating with said drum; a peripheral bead formed on said inner casing adjacent its upper end to provide a circumferential space in communication with the space between said inner and said central casings; and outlet delivery means communicating with said circumferential space.

3. A water heater of the class described comprising an outer casing; an inner casing; means for insulating said casings from each other; a central casing spaced from said inner casing; a hollow base having openings formed in its upper side communicating with the space between said central casing and said inner casing and provided on its upper face with a recess; a cylindrical heating element positioned within said central casing; a drum positioned within said heating element and engaging in the recess of said base and communicating with said base through openings; a conduit for delivering liquid to said base; outlet delivery means communicating with said drum; a peripheral bead formed on said inner casing adjacent its upper end to provide a circumferential space in communication with the space between said inner and said central casings; and outlet delivery means communicating with said circumferential space.

In testimony whereof we have signed the foregoing specification.

LOUIS B. HYDE.
MICHEL S. GAZELLE.